United States Patent
Creamer et al.

(10) Patent No.: US 7,239,696 B2
(45) Date of Patent: Jul. 3, 2007

(54) AUTOMATIC RESET FOR DSL LINES

(75) Inventors: Thomas E. Creamer, Boca Raton, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 10/736,139

(22) Filed: Dec. 15, 2003

(65) Prior Publication Data

US 2005/0129222 A1 Jun. 16, 2005

(51) Int. Cl.
*H04M 1/24* (2006.01)
(52) U.S. Cl. .................. 379/399.01; 714/4; 379/27.01
(58) Field of Classification Search ................ 370/216, 370/242, 244, 465; 714/1, 2, 3, 4, 23, 100
See application file for complete search history.

(56) References Cited

U.S. PATENT DOCUMENTS

| 6,161,203 | A | 12/2000 | Zuranski et al. |
| 6,535,551 | B1 | 3/2003 | Sweitzer et al. |
| 6,570,915 | B1 | 5/2003 | Sweitzer et al. |
| 6,603,808 | B1 | 8/2003 | Anne et al. |
| 6,788,705 | B1 * | 9/2004 | Rango ........................ 370/465 |
| 2001/0024456 | A1 | 9/2001 | Zaun et al. |
| 2003/0053449 | A1 * | 3/2003 | Owens et al. ............... 370/355 |
| 2003/0086514 | A1 | 5/2003 | Ginis et al. |

* cited by examiner

*Primary Examiner*—Sinh Tran
*Assistant Examiner*—Walter F Briney, III
(74) *Attorney, Agent, or Firm*—Akerman Senterfitt

(57) ABSTRACT

A method of automatically resolving a Digital Subscriber Line failure can include detecting a failure of the Digital Subscriber Line and establishing a call over a public switched telephone network with an administrative system for the Digital Subscriber Line. The method further can include notifying the administrative system for the Digital Subscriber Line of the failure over the established call. The administrative system then can cause the Digital Subscriber Line to be reset.

15 Claims, 1 Drawing Sheet

AUTOMATIC RESET FOR DSL LINES

BACKGROUND

1. Field of the Invention

The invention relates to communications systems and, more particularly, to Digital Subscriber Line (DSL) communications.

2. Description of the Related Art

DSL is a digital form of data communications that dramatically increases the digital capacity of ordinary telephone lines or the local loops into homes or offices. Digital communication is the exchange of information in binary form. Unlike an analog signal, a digital signal does not use continuous waves to transmit information. Instead, DSL transmits data using discrete signals, for example, on and off states of electrical current.

DSL provides an always-on operation in which digital data does not travel through the Public Switched Telephone Network (PSTN). Instead, at the Central Office (CO), digital data is aggregated and forwarded to an appropriate Internet Service Provider (ISP) or data network.

There are several varieties of DSL. High Bit Rate DSL (HDSL) is a symmetric technology, which provides the same transmission rate in both downstream and upstream directions. Symmetric DSL (SDSL) is an HDSL variation that uses only one cable pair and is offered in a wide range of speeds from 144 Kbps to 1.5 Mbps. SDSL is a rate adaptive technology. Asymmetric DSL ("ADSL") is a DSL flavor that shares the same line as the telephone, since it uses higher frequencies than the voice band. A version of ADSL is known as G.lite. Other varieties of DSL can include Rate Adaptive DSL (RADSL) that adjusts speed based on line quality, Very High Bit Rate DSL (VDSL) that is an asymmetric version used as the final drop from a fiber optic junction, and ISDN DSL (IDSL). The specifications for these and other flavors of DSL are hereby incorporated by reference.

From time to time, a DSL line may become out of sync with the CO or DSL modem within a DSL operation center and fail to work. Such failures can occur up to several times per month. These failures manifest themselves to users as a loss of service, or more particularly, as a loss of the ability to connect to the Internet. When such failures occur, the user may think that the computer or the DSL modem are responsible for the problem. As a result, the user may try to implement corrective action such as changing computer system and/or DSL modem settings or calling a helpline. This can frustrate users as the source of the problem is not the computer system or the DSL modem, but rather the DSL line itself. The user is effectively diverted from determining the actual source of the problem.

SUMMARY OF THE INVENTION

The present invention provides a method, system, and apparatus for resolving a failure of a Digital Subscriber Line (DSL). The present provides a solution for automatically detecting such failures and implementing corrective action without involvement of the user or customer service personnel. Generally, the present invention can detect a failure in a DSL line and notify an appropriate party of the failure thereby causing the DSL line to be reset.

One aspect of the present invention can include a method of automatically resolving a Digital Subscriber Line failure. The method can include detecting a failure of the Digital Subscriber Line and establishing a call over a public switched telephone network with an administrative system for the Digital Subscriber Line. The method also can include notifying the administrative system for the Digital Subscriber Line of the failure over the established call. Accordingly, the administrative system can cause the Digital Subscriber Line to be reset.

In another embodiment of the present invention, the notifying step can include requesting the reset of the Digital Subscriber Line. The method further can include the administrator identifying the Digital Subscriber Line with the failure using caller identification on the received call. The administrative system can send a reset message to a modem within a Digital Subscriber Line operation center, wherein the modem is associated with the Digital Subscriber Line with the failure. The administrative system also can establish a telephone call with a subscriber endpoint associated with the Digital Subscriber Line with the failure and provide information relating to the failure of the Digital Subscriber Line to the subscriber endpoint over the established telephone call.

Another aspect of the present invention can include a Digital Subscriber Line modem configured to detect a failure in a Digital Subscriber Line and place an outgoing call over a public switched telephone network to an administrative system of the Digital Subscriber Line to notify the administrative system of the failure. The Digital Subscriber Line modem also can be configured to request the Digital Subscriber Line be reset.

Other embodiments of the present invention can include a system having means for performing the various steps disclosed herein and a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
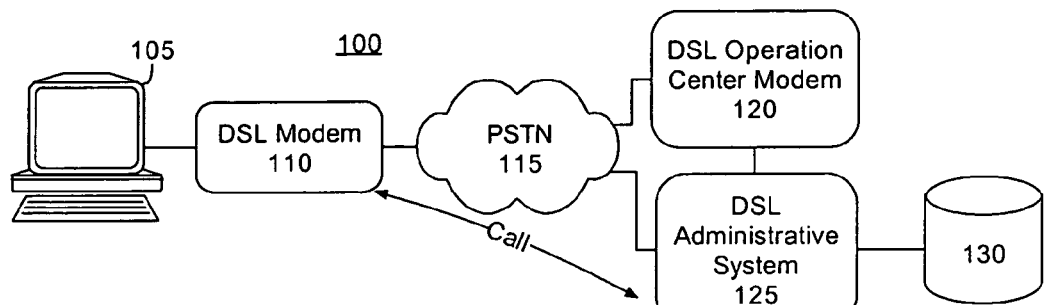
FIG. 1 is a schematic diagram illustrating a system for resetting a Digital Subscriber Line (DSL) line in accordance with one aspect of the present invention.

FIG. 1 is a schematic diagram illustrating a system for automatically resolving and resetting a Digital Subscriber Line (DSL) failure in accordance with one aspect of the present invention. As shown, the system 100 can include a computer system 105, a DSL modem 110, the Public Switched Telephone Network (PSTN) 115, a DSL operation center modem 120, a DSL administrative system 125, and a data store 130.

The computer system 105 can be any of a variety of computing systems, whether a general purpose desktop system, a laptop computer, or any other computer system capable of connecting with the DSL modem 110. The DSL modem 110 can be a standalone unit which can communicatively link the computer system 105 with the corresponding DSL operation center modem 120 over a DSL communications link through the PSTN 115. Accordingly, the DSL modem 110 and the DSL operation center modem 120 provide the computer system 105 with a high-speed network connection to the Internet. It should be appreciated, however, that the DSL modem 110 also can be incorporated within the computer system 105, and that the present invention is not limited to one particular type of configuration.

In any case, the DSL modem 110 can be configured to detect a failure in the DSL communication link with the DSL operation center modem 120. The DSL modem 110 also can include a conventional telephony interface for placing outgoing calls over the PSTN 115. Accordingly, when a failure is detected, the DSL modem can be configured to place an outgoing telephone call to the administrative system 125 to notify the DSL administrative system of the detected failure.

It should be appreciated that in another embodiment of the present invention, the DSL modem 110 can instruct the computer system 105 to place such a call through a conventional modem disposed within the computer system 105.

The DSL administrative system 125 can be communicatively linked with the DSL operation center modem 120, whether through a network, a direct connection, the PSTN 115, or Internet. The DSL administrative system 125 also can include a telephone interface for receiving calls and initiating calls over the PSTN 115. In one embodiment, the DSL administrative system 125 can be implemented as an information processing system having suitable operational software for causing the DSL administrative system 125 to perform the various functions described herein. Regardless, the DSL administrative system 125 can be programmed to send reset messages to the DSL operation center modem 120 thereby causing the unit to implement a system reset to effectively reset the DSL communications link with the DSL modem 110.

The system 100 also can include a data store 130, within which notification information received from the DSL modem 110 can be stored. The data store 130 also can store any information generated by the DSL administrative system 125 or the DSL operation center modem 120 in response to a notification from the DSL modem 110.

In one embodiment of the present invention, the computer system 105 and the DSL modem 110 can be located within the home or office of a DSL subscriber. The DSL operation center modem 120, the DSL administrative system 125, and the data store 130 can be located within a DSL provider office, for example a Central Office or other telephony or network service provider. Still, the present invention is not limited by the particular location of the components disclosed herein. For example, one or more of the aforementioned components can be remotely located from one another.

Figure 2:
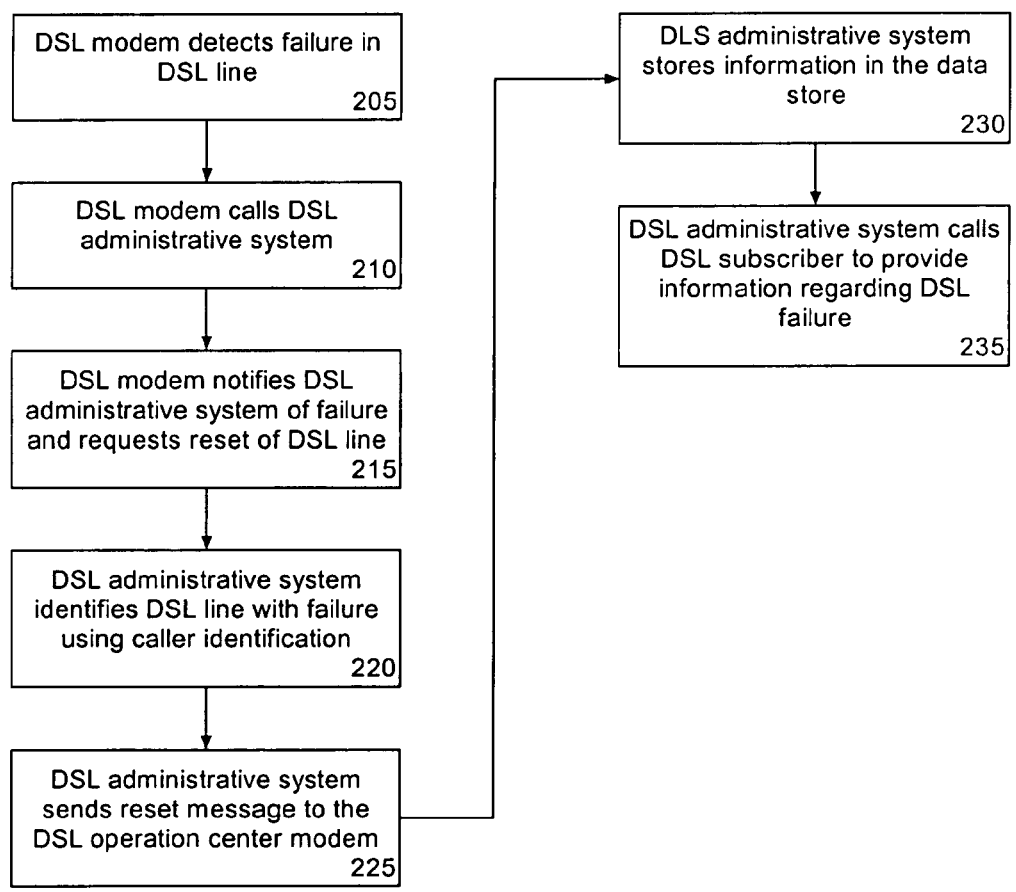
FIG. 2 is a flow chart illustrating a method of resolving a DSL line failure in accordance with another aspect of the present invention.

FIG. 2 is a flow chart illustrating a method 200 of automatically resolving a DSL line failure in accordance with another aspect of the present invention. The method can begin in a state where a user has installed a DSL modem and has established a DSL communications link with a DSL operation center modem. The method 200 can begin in step 205 where a subscriber's DSL modem detects a failure in the subscriber's DSL line or DSL communication link with the DSL operation center modem.

As noted, from time to time, a DSL line may become out of sync with the DSL provider and fail to work. Such failures can occur up to several times per month. These failures manifest themselves to subscribers as a loss of service, or more particularly, as a loss of the ability to connect to the Internet.

In step 210, the DSL modem can call the DSL administrative system. That is, the DSL modem can call a number that has been programmed or stored within the unit. The number can correspond to a DSL administrative system or an operator of the DSL line. Accordingly, the DSL modem places the telephone call over the PSTN. Notably, the telephone call can be placed by the subscriber's DSL modem over the same DSL twisted pair that experienced the DSL line failure. In any case, the call can be placed to the DSL administrative system responsive to detecting the DSL line failure.

In step 215, once the call between the DSL modem and the DSL administrative system has been established, the DSL modem can notify the DSL administrative system of the DSL line failure. This notification can be a message sent from the DSL modem or can be the very act of calling the DSL administrative system. In one embodiment, the DSL modem can request a reset of the DSL line experiencing the failure. In another embodiment, the act of calling and/or notifying the DSL administrative system of the problem can automatically initiate a reset.

In step 220, the DSL administrative system can identify the particular DSL line with the failure. The DSL administrative system can identify the DSL line using caller identification. That is, the calling number of the DSL modem can be identified and used to cross-reference the identity of the subscriber and/or the DSL line associated with that subscriber.

In step 225, the DSL administrative system sends a reset message to the DSL operation center modem. The DSL operation center modem, responsive to receiving the reset message or instruction from the DSL administrative center can perform a system reset.

In step 230, the DSL administrative system stores information relating to the failure in the data store. The information stored in the data store can include, but is not limited to, any data received from the subscriber's DSL modem over the telephone call, any information relating to the course of action implemented by the DSL administrative system and/or DSL operation center modem, including information exchanged between the two.

In step 235, the DSL administrative system can initiate a telephone call to an endpoint, or a number associated with the DSL subscriber that experienced the DSL line failure. That is, the subscriber associated with the DSL line having the failure can be notified. It should be appreciated that the DSL administrative system can call any number associated with the subscriber, for example one that is one file or one that was specified as a contact number by the subscriber. Over the call, the subscriber can be informed of why the DSL line has failed or is off-line as well as when the DSL line or service is expected to be restored or come back on-line.

In one embodiment, the DSL administrative system need not call in every case. For example, if a predetermined amount of time has passed since a reported DSL line failure and the DSL line or service has not been restored to the reporting subscriber, the DSL administrative system then can initiate such a call.

The method 200 has been provided for purposes of illustration only. As such, it should be appreciated that one or more of the steps disclosed herein can be performed in differing order depending upon the particular configuration of the present invention. In any case, the examples disclosed herein are not intended as a limitation of the present invention.

The present invention provides a solution for automatically resolving failures of DSL lines and initiating resets of such lines without the involvement of the subscriber or other service personnel. The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of automatically resolving a Digital Subscriber Line (DSL) communication link failure comprising:
   detecting a failure of the DSL communication link to a subscriber DSL modem;
   placing a telephone call over a public switched telephone network to an administrative system of the DSL service provider in response to detecting the failure of the DSL communication link;
   notifying the administrative system for the DSL service provider of the failure during the telephone call, whereby the administrative system causes the DSL communication link to be reset;
   storing in a data store connected to the administrative system at least one of notification information received by the administrative system and information generated by the administrative system relating to a course of action implemented by the administrative system in response to the notifying step; and
   sending a message informing a subscriber associated with the subscriber DSL modem of when restoration of the DSL communication link to the subscriber DSL modem is expected, said message being sent by the administrative system only after a predetermined amount of time has passed since notification of the administrative system of the failure and the DSL communication link with the subscriber DSL modem has not been restored.

2. The method of claim 1, said notifying step further comprising requesting the reset of the DSL communication link.

3. The method of claim 1, further comprising the administrative system identifying the DSL communication link with the failure using caller identification on the received telephone call.

4. The method of claim 3, further comprising the administrative system sending a reset message to a provider DSL modem within a DSL operation center, wherein the provider DSL modem is associated with the DSL communication link with the failure.

5. The method of claim 4, further comprising:
   the administrative system establishing a telephone call with a subscriber endpoint associated with the DSL communication link with the failure; and
   providing information relating to the cause of the failure of the DSL communication link to the subscriber endpoint over the established telephone call.

6. A system for automatically resolving a Digital Subscriber Line (DSL) communication link failure comprising:
   means for detecting a failure of the DSL communication link to a subscriber DSL modem;
   means for placing a telephone call over a public switched telephone network to an administrative system of the DSL service provider in response to detecting the failure of the DSL communication link;
   means for notifying the administrative system for the DSL service provider of the failure during the established telephone call, whereby the administrative system causes the DSL communication link to be reset;
   means for storing in a data store connected to the administrative system at least one of notification information received by the administrative system and information generated by the administrative system relating to a course of action implemented by the administrative system in response to the notifying step; and
   means for sending a message informing a subscriber associated with the subscriber modem of when restoration of the DSL communication link to the subscriber DSL modem is expected, said message being sent by the administrative system only after a predetermined amount of time has passed since notification of the administrative system of the failure and the DSL communication link with the subscriber DSL modem has not been restored.

7. The system of claim 6, said means for notifying further comprising means for requesting the reset of the DSL communications link.

8. The system of claim 6, further comprising means for the administrative system to identify the DSL communication link with the failure.

9. The system of claim 8, further comprising means for the administrative system to send a reset message to a provider DSL modem within a DSL operation center, wherein the provider DSL modem is associated with the DSL communication link with the failure.

10. The system of claim 9, further comprising:
   means for the administrative system to establish a telephone call with a subscriber endpoint associated with the DSL communication link with the failure; and
   means for providing information relating to the failure of the DSL communication link to the subscriber endpoint over the established telephone call.

11. A machine readable storage, having stored thereon a computer program having a plurality of code sections executable by a machine for causing the machine to perform the steps of:
   detecting a failure of a DSL communication link to a subscriber DSL modem;
   establishing a telephone call over a public switched telephone network with an administrative system for the DSL communication link with in response to detecting a failure of the DSL communication link;
   notifying the administrative system for the DSL communication link of the failure over the established telephone call, whereby the administrative system causes the DSL communication link to be reset;

storing in a data store connected to the administrative system at least one of notification information received by the administrative system and information generated by the administrative system relating to a course of action implemented by the administrative system in response to the notifying step; and sending a message informing a subscriber associated with the subscriber DSL modem of when restoration of the DSL communication link to the subscriber modem is expected, said message being sent by the administrative system only after a predetermined amount of time has passed since notification of the administrative system of the failure and the DSL communication link with the subscriber DSL modem has not been restored.

12. The machine readable storage of claim 11, said notifying step further comprising requesting the reset of the DSL communication link.

13. The machine readable storage of claim 11, further comprising the administrative system identifying the DSL communication link with the failure using caller identification on the received telephone call.

14. The machine readable storage of claim 13, further comprising the administrative system sending a reset message to a provider DSL modem within a DSL operation center, wherein the provider DSL modem is associated with the DSL communication with the failure.

15. The machine readable storage of claim 14, further comprising:

the administrative system establishing a telephone call with a subscriber endpoint associated with the DSL communication link with the failure; and providing information relating to the failure of the DSL communication link to the subscriber endpoint over the established telephone call.

* * * * *